July 31, 1956 R. J. STAHL 2,757,230
COLOR TELEVISION CAMERA SATURATION CONTROL CIRCUIT
Filed Nov. 25, 1952
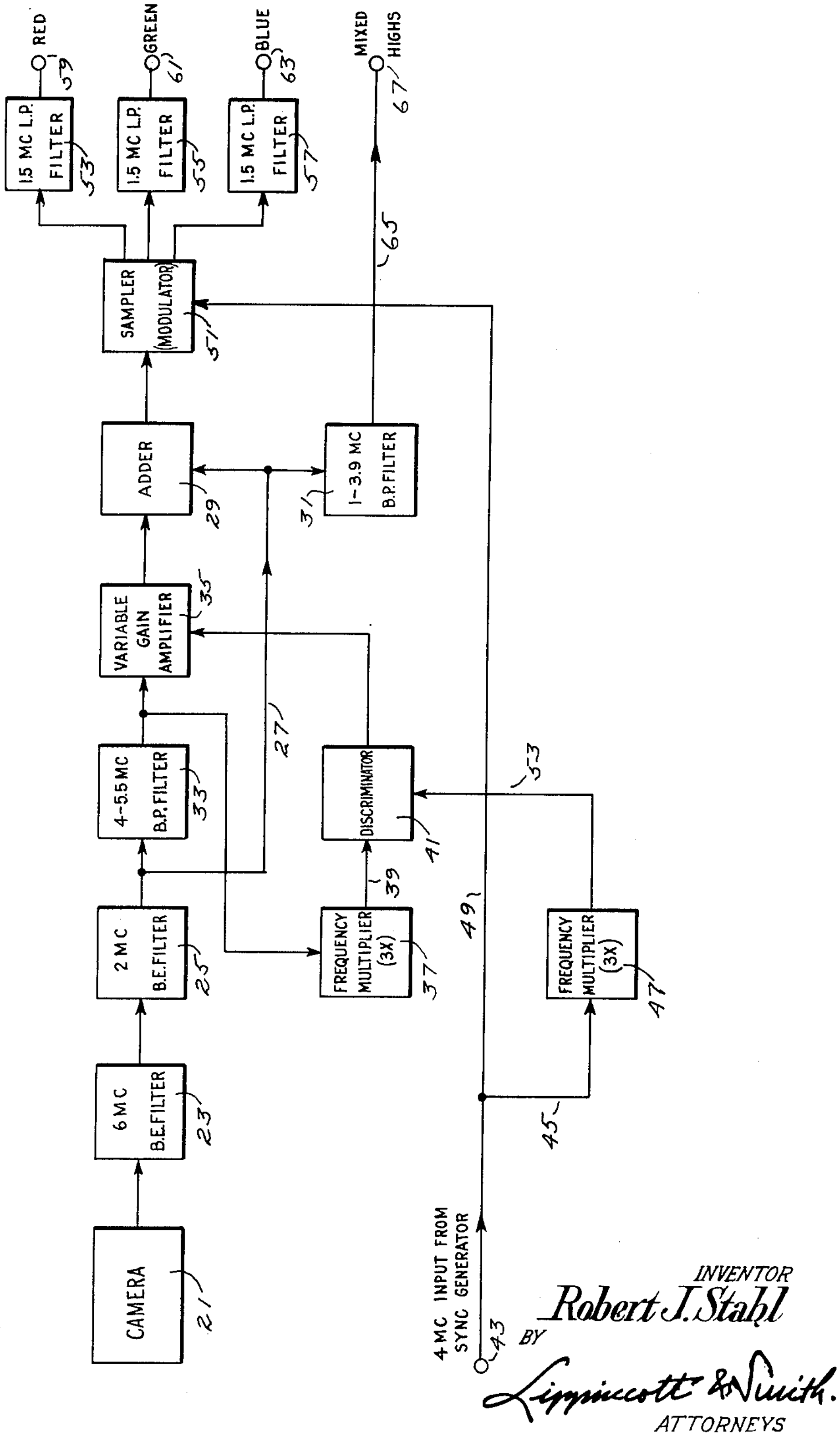
INVENTOR
Robert J. Stahl
BY
Lippincott & Smith
ATTORNEYS United States Patent Office 2,757,230

Patented July 31, 1956

2,757,230

COLOR TELEVISION CAMERA SATURATION CONTROL CIRCUIT

Robert J. Stahl, Redwood City, Calif., assignor to Color Television Incorporated, San Carlos, Calif., a corporation of California Application November 25, 1952, Serial No. 322,382

6 Claims. (Cl. 178—5.4)

This invention relates to circuitry usable with television camera pickup tubes adapted particularly for tricolor television. Pickup tubes of this character and providing storage, as explained in the copending application filed by this inventor and Norman L. Heikes entitled "Color Television Camera," filed November 30, 1951, as Serial No. 259,193, are incorporated in the there-disclosed television camera without tube modifications over those tubes used for television transmissions in monochrome (such as black-and-white). The transition between monochrome and color is established through the use herewith of a strip-type color filter and a so-called tracking filter, each of which is imaged upon the camera tube light sensitive surface, as explained in the mentioned application for U S. Letters Patent. The image of the scene is projected upon the camera tube through the color filter and upon this image there is superimposed the image of the tracking filter. The color filter is formed of strips of unsaturated primary or component colors of a tricolor of the additive variety, such as red, green and blue. The tracking filter is imaged from strips of alternately different light transmitting values which may be either an alternating series of transparent and opaque strips or alternating light transmitting strips of which one transmits a different light quantity than the other.

The strips of the color filter are of such a width that during a normal scanning operation within the camera tube for the selected operating standards the color cycle will repeat approximately four times during each microsecond period of scanning. The scanning pattern is intended to follow the presently standardized 525 line picture of black-and-white repeated 30 frames per second interlaced two-to-one (2:1). Operations of this character normally provide video modulation frequencies from the lowest (at the 30 cycle frame scanning rate) up to about a four megacycle range or slightly therebeyond. Thus, the actual width of any filter strip will be determined in accordance with the particular type of camera tube used. With each filter strip of a length corresponding substantially to the one dimension of the scanned raster (for instance, for line scanning in the long dimension, the raster shorter dimension so that the strips are crossed by the scanning beam) and the width of a proportional part of the other dimension of the raster, such that the above assumed color repetition cycle can be obtained. This may be said in another way by pointing out that any one color filter strip width is one-twelfth (1/12) the distance which would be transversed by the camera tube scanning beam in a one microsecond period. With representative camera tubes of the so-called "image orthicon" variety the image area on the camera tube occupies a height of approximately 0.9″ and is of a width of approximately 1.2″. This will provide a color filter strip width of approximately 0.0018″ if the filter is imaged upon the camera tube in a one-to-one relationship. Otherwise, the strip width is proportional to that above mentioned.

The tracking filter strips are approximately the same width (for the same imaged relationship relative to the camera) but since there are only two varieties of tracking filter strips (a section which transmits light reasonably well and a section which transmits a lesser amount of light as against strips of unsaturated red, green and blue for the color filter) the developed tracking frequency will be of the order of about six megacycles since it is 3/2 of the color cycle repetition frequency.

The invention herein to be described is one which is designed for use with camera tubes and operating circuitry of the aforementioned type. It is well known and is explained for instance to some extent in the text "Storage Tubes and Their Basic Principles" by Knoll and Kazan, published in 1952 by John Wiley & Sons, Inc., New York, that camera pickup tubes have generally limited resolution for fine detail. This holds especially true for conditions of low illumination. The condition is further evidenced with reference to the high frequency information introduced by the color filter strips, such as those above mentioned, where the color cycle repeats at a rate near the upper frequency limit of the television apparatus and circuit with which it is to be used.

One of the most important phenomenon tending to limit resolution in the case of the so-called "image orthicon" type of camera tube is charge dispersion on the target due to conductivity of the material of which it is composed. There are also other limitations arising because of the electron image defocusing which effect is due to the emission velocity and the finite scanning beam diameter.

For conditions where a scene imaged upon a camera tube is analyzed into its color components by means of color filter strips composed of each of the primary or component colors of an additive system, say red, green and blue, repeated cyclically any given color combination (of course, excluding white in a pickup equalized on an equal energy basis) produces a video frequency corresponding to the rate of scanning these color cycles. Each color cycle consists of one of each of the three selected primary or component colors. The phase of the video frequency developed depends upon the hue being scanned. The amplitude of the developed wave will vary in accordance with the color saturation, in which case it will, of course, be a maximum for either one or two pure primaries that is primary colors which are completely saturated in the scene being scanned, but will be a minimum for white which is, of course, complete desaturation. Consequently, the amplitude of the color frequency of the camera video output is proportional to the light intensity difference between adjacent color strips as they are imaged upon the light sensitive element of the camera tube to produce the charge effects which are measured and determined in the scanning analysis process.

The charge dispersion in camera tubes of the so-called "image orthicon" type, as previously mentioned, tends to reduce the effect of amplitude difference between strips by reason of the migration of charges corresponding to illuminated strips into areas occupied by the lesser illuminated adjacent imaged strips. Depending upon how narrow is the lesser illuminated area depends the seriousness of the reduction of the output signal amplitude due to the effects of charge migration (some discussion of the effect of charge migration appears in the above noted text "Storage Tubes" by Knoll and Kazan).

This reduction in the signal amplitude resulting from charge migration becomes more and more serious depending upon the narrowness of the lesser illuminated area. A charge migration is generally considered to result in a spreading of the developed charge image detail by an amount dependent upon the individual brightness involved in the illuminated and unilluminated adjacent areas. It also depends to some extent upon the particular operating characteristics of the particular camera tube under consideration. The charge migration is substantially independent of the extent of the area illuminated so long as the area exceeds the resolution limit of the tube. It is always in a direction toward the unilluminated areas. This condition results in reduced resolution to dark detail on a light field compared to the resolution of light detail in a dark field.

Since the optical image reaches the camera tube according to the present proposal through a strip-type color filter as above set forth, and the light values for each color strip can be any value, either of the foregoing situations as explained above many in effect exist. In order that distortion in color values which would impair truly high fidelity operations shall not exist, it is important that these conditions should be utilized.

Accordingly, considering illumination of the light sensitive surface of the camera tube by way of the strip-like color filters and assuming that the illumination is substantially only single pure primary color only, for example red, it will be apparent that between each area illuminated by red there will be a so-called dark space of two strip widths. This dark space will then correspond to the areas which normally should be illuminated by blue and green light through the filters.

Considering a case where the illumination is primarily of but two primary colors, for example, red and green, the dark space would be reduced to a width of one strip only, for example the width normally occupied by the position of the so-called blue filter. The change in the dark strip width with a change in the character of illumination will cause varying amounts of desaturation (or reduction in color frequency signal) to be introduced by charge dispersion due to above mentioned effects.

It is impossible adequately to compensate for an effect of this nature by ordinary methods since the effect is dependent upon the relative amplitude of the particular color primaries in the color combination being scanned. It is to compensate for effects of this nature with which this present application is primarily concerned. One of the objects of the invention is accordingly that of providing television color camera apparatus wherein adequate compensation can be made for a lack of accuracy in signal output brought about as a result particularly of charge migration in the analyzing camera tube.

Another object of the invention is to provide compensating circuitry for use in color television apparatus wherein the desired compensation may be achieved with a minimum of additional circuitry over and above that normally contemplated when the image analysis in its color components results from scanning in a camera tube wherein the infalling light image is projected through light color filter having strips formed in cyclically repeating sequences of addited (unsaturated) primary or component colors.

Other objects and advantages of the invention will, of course, become apparent from a reading of the following description, particularly in conjunction with the accompanying drawing of which the single figure schematically represents the circuit components outlined to achieve the result hereinabove mentioned.

As was mentioned in the copending application for Letters Patent of the U. S., Serial No. 259,193, above identified, the signals resulting from scansion within the camera tube include information as to both the color cycle and the tracking rate, as well as the video signal. The tracking frequencies are suitably eliminated by any desired means leaving signals indicative of the image scanning in its various component colors. From these signals, as explained in the companion case identified, it is possible to derive signals (for the color information) occupying a low frequency range (approaching D. C. up to some value such as 2.0 mc. or less) and signals indicative of image detail (the so-called "mixed highs") which include those signals occupying a frequency range starting, for instance, in the neighborhood of 1.5 mc. and continuing to the highest frequency which the system or circuitry is designed to pass. For present standards, such as those above generally defined, a top limiting frequency is usually in the neighborhood of 4.0 mc.

Considering a premise such as that briefly outlined, the infalling light image (not shown) is adapted to be picked up by a conventional camera tube apparatus diagrammatically indicated at 21 in which video signal output of the aforesaid character is available. Assuming the presence in the signal output of signals indicative of the rate of tracking within the camera these tracking signals may be separated or eliminated from the composite signal, which is accomplished by any suitable form of filter such as that represented by the band elimination filter 23. The band elimination filter may be of any suitable and conventional form providing it acts in the nature to pass any frequency up to that assumed for the color tracking frequency (assumed at 6.0 mc.) but which will reject frequencies corresponding to the tracking frequency. Signal output of this nature is then passed into a two megacycle band elimination filter 25 (assuming four megacycle color cycle frequency and the six megacycle tracking frequency). This filter, like the band elimination filter 23, may be designed illustratively in accordance with the showing in the text "Radio Engineers' Handbook" by Henney, published by McGraw and Hill Book Co., Inc., in 1941 (third edition) with the band elimination type of filter discussed particularly at pages 174 and 175. In this instance, with the assumed four megacycle color cycle frequency and the assumed six megacycle tracking frequency, the band elimination filter 25 is used to remove any cross modulation products between the four megacycle and the six megacycle pattern. Actually, by making the filter selection sharp, a negligible amount only of the video information is suppressed and removed so that the overall effect is not of a damaging nature as far as the output signal is concerned. For some types of operation the filters 23 and 25 may be eliminated under conditions where the 2 mc. and 6 mc. components do not have a detrimental subjective effect upon the operation.

The output signal energy from the band elimination filter is fed along two paths of which one, by way of the conductor 27, supplies both an adder or mixer unit 29 and a 1.0 to 3.9 mc. band pass filter 31, each of which components will later be described. The other signal path for the camera output signal, with the tracking frequency removed by the band elimination filter 23, and with the beat frequency representing a cross modulation product of any pattern formed between the color cycle frequency and the tracking frequency also removed, is supplied to the band pass filter 33, the band pass filters 31 and 33 may each be of any well known character provided they pass the selected frequency bands, although the types of filters diagrammatically represented in the above mentioned Henney text and shown particularly at pages 175 and 176, are satisfactory. The signal output from the band pass filter 33 is supplied also along two paths of which one is into the variable gain amplifier schematically shown at 35, and later to be discussed, and the other of which is into the frequency multiplier 37. The input frequency to the filter 37 is multiplied by a factor of three (3) prior to its being supplied by way of conductor 39 into a discriminator unit 41. The frequency multiplier unit may be, generally speaking, any well known form of harmonic generator. Illustratively one might consider a component of the type shown in the text "Radio Engineering" by Frederick E. Terman, published by McGraw and Hill Book Co., Inc., in 1947, making particular reference to the portion of the text beginning on page 394, for instance.

Accordingly, it will be seen that the input frequency to the frequency multiplier 37 is from the output of the band pass filter 33. The input frequency to the multiplier corresponds to the color repetition cycle frequency and is approximately 4 megacycle (that frequency corresponding to the instantaneously obtaining color cycle) with its phase determined by the relative amplitude of the primary color components. This wave form appearing in the output of the filter 33 generally approximates sine wave formation, with the phase dependent upon the instantaneously predominating color. When a wave form of this characteristic is supplied to the frequency multiplier 37 herein and is multiplied by the factor three (3) the nominal color frequency output is changed from the 4 megacycle input assumed to a 12 megacycle output. In addition, the frequency multiplier 37 increases any phase change by a factor of 3 so that a change of $\pm\frac{1}{3}$ of a color cycle coming about as changing from one primary or component color to any adjacent primary or component color produces a change of 3 times the assumed ⅓ cycle of a one complete cycle change in the 12 megacycle output. A phase shift or change of a complete cycle is, of course, equivalent to no shift at all.

Considering, however, the change in phase which would be brought about by changing from any one primary color to a combination of two adjacent primary or component colors (in the assumed condition of color filter strips arranged in a sequence of red, green, blue, red and so on any two primary or component colors will be adjacent) will be ⅙ of a color cycle assuming equal amplitude in the two adjacent primary or component colors. If such a change is multiplied by a factor of 3 in the frequency multiplier unit 37 the net shift in phase is ½ cycle (or 180 degrees). This amount of shift, of course, means a complete reversal of phase.

The condition of equal illumination in all primary or component colors need not be discussed because the phase shift condition then will not come about for reasons already explained.

As was mentioned in the copending application for U. S. Letters Patent, Serial No. 259,193, the sync signal generator includes a unit having stable frequency and phase which develops the assumed standard color frequency. This unit is not shown herein but its output is made available, illustratively, at the terminal point 43. This voltage is supplied along a path 45 into a frequency multiplier unit 47 and along a conducting path 49 to a sampler or modulator 51, later to be described.

The frequency multiplier 47 multiplies the incoming wave by a factor of 3. It is of the same general characteristics as the frequency multiplier unit 37, above described. The multiplied frequency output is supplied by a conductor 53 to the discriminator 41 to which is also, as above mentioned, the multiplied frequency output from the frequency multiplier unit 37. Assuming the input at the terminal 43 to be a signal voltage of 4 megacycles, the frequency multiplier output on the conductor 53 supplied to the discriminator will be a signal voltage of 12 megacycles which is discriminated against the input available on conductor 39 leading to the discriminator 41.

In this connection it should be borne in mind that the color cycle repetition voltage available at the terminal 43 is developed at precisely the optimum color cycle repetition frequency and at the reference color phase, for example red, so that from the discriminator unit 41 there results an output voltage which changes in sign and magnitude due to above-explained change in the 12 mc. voltage from the frequency multiplier 37 as the color scanned by the camera changes from what amounts to a predominating single primary to two predominating primaries. This can also be expressed by pointing out that the voltage output from the discriminator, accordingly, can designate changes in the illumination of the camera tube from conditions where one color predominates to a mixture of other predominating colors and, of course, the predominating color in this instance need not be one of the selected primaries. Illustrative of this situation would be illumination where the predominating color was a cyan or turquoise where the green and blue primaries are mixed.

As can be expected, illumination by three equal intensity primary colors red, green and blue will give no discriminator output. The discriminator may be of any suitable and convenient type such, for instance, as that shown by the text "Television Engineering," by D. G. Fink published 1952 by McGraw-Hill Book Company, Inc., at page 210, which provides for determining the phase and frequency difference, although it may be suggested that in some respects a more uniform characteristic with respect the color frequency amplitude can at times be obtained through the use of the so-called over-driven mixer, such as shown by Section 10–8 starting at page 527 of the text "Radio Engineering" by F. E. Terman, published also by McGraw-Hill Book Company, Inc., 1947, with the input signal of sufficient amplitude to "over-drive" the tube so that ordinary variation in input level will produce no change in output level, rather than a conventional discriminator. For an instance of this condition, if sufficiently large signals are applied to the grids of a pentagrid mixer considerable wave squaring will be produced. This will give an effective signal magnitude which is quite independent of the original amplitude as long as it exceeds a certain minimum value. Low frequency voltage at the plate of the mixer tube will vary with the relative phase between the two signals applied to the input grids.

It was above mentioned that the camera video signal as developed at the camera tube 21 and with 6 megacycle tracking frequency removed, as well as a band of frequencies in the region of 2 megacycles, (representing the beat particularly between the color cycle frequency and the tracking frequency) and also the frequency range generally above the highest developed video frequencies are all supplied to the variable gain amplifier 35. An amplifier of this general character is shown and disclosed by the Fink text, above named, at page 405, for instance. In an amplifier of this character the gain is then controlled by using the output of the discriminator 41 as the bias which establishes the amplifier gain. The result is that there is applied as one signal input of the adder or mixer 29 the output of the variable gain amplifier and as another signal input that signal voltage which is available on the conductor 27 and which represents the camera tube output with only the tracking frequency and the beat pattern between the tracking frequency and the color cycle frequency removed. Such a type of adder circuit may be of any commonly used conventional type such as that shown at page 641 in the text "Waveforms" by Chance et al., published by McGraw-Hill Book Co., Inc., in 1947.

Of these types of circuits one which is particularly usable in character with the present invention embodies a pair of pentode tubes having a common output circuit but having the output of the variable gain amplifier control the input to one tube and the signal available on the conductor 27 control the input to the other tube. When these signals are combined and bearing in mind that there is always present a pedestal upon which the color information is superimposed (a pedestal arising because of the unsautrated color filter of the camera) the color information may be derived by way of a sampler circuit or modulator conventionally represented at 51 and described more particularly in the above referred to companion application Serial No. 259,193. Essentially the sampler is an electronic switch (of which many varieties are well known) arranged to connect in sequence to three different outputs. It is controlled by the color cycle frequency available at the terminal point 43 and upon the conductor 49 connecting into the sampler or modulator 51. It synchronously connects in sequence to each of three different output filters 53, 55 and 57 so that each of these units receives a signal only while a specific component of the tricolor is being scanned.

The sampler per se is too well known as an electrical unit to require illustration. Components of the same general nature have been widely used for taking samples in various operations in television. One such use was that made by Radio Corporation of America in connection with its color television system. The complete problem of sampling was discussed in detail by Radio Corporation of America in a brochure entitled "An Analysis of the Sampling Principles of the RCA Television System." This brochure was introduced as Exhibit No. 379 in the hearings on color television held before the Federal Communications Commission in Washington, D. C., in the early part of the year 1950 with the particular discussion having occurred in March 1950.

However, generally speaking, for efficiently carrying out the aims and objects of this invention it is to be preferred that the output pulse of the sampler be taken in the region of the peak of the sampling wave to prevent color contamination. For the operation according to conditions which are most frequently to be experienced the sampling is usually limited to approximately 15 degrees of the color cycle, timed to the scanning of the mid-portion of the corresponding color strip, so that admixture of adjacent color information is minimized. Each of the filters 53, 55 and 57 is arranged as the well known type of low pass filter and cuts off all frequencies above approximately 1.5 megacycles. The output from these filters is made available at the terminals 59, 61 and 63 respectively providing simultaneously the red, the green and the blue color signals, since the color frequency itself (nominally 4 mc.) is not passed, and only the lower frequency (up to 1.5 mc.) color video signal components are continuously present.

It was above mentioned that a part of the output from the camera tube as available on the conductor 27 was supplied to the band pass filter 31. This is a completely conventional band pass filter and in the instance shown is arranged to pass frequencies in the range of between approximately 1.0 and 3.9 megacycles. These signals are indicative of the high detail in the scanning image and are passed by the unsaturated color filter at the camera. They thus represent on the output conductor 65 the high detail signal information in monochrome which when used at the terminal 67 are designated as the so-called mixed highs signals.

The 4–5.5 mc. band pass filter 33 is intended to pass a frequency range such that the control exercised upon the output connected variable gain amplifier 35 shall be effective only from the standpoint of color. It is assumed in what has been stated up until this point in the description that the color repetition frequency is approximately 4 megacycles. This frequency acts in the nature of a color carrier and thus carries with it modulation representing the color information. If it be assumed that in the output information from the filter 33 there is a range of side band frequencies indicating color detail from the lowest frequency to approximately 1.5 mc. desired for all colors then it is desirable that the band pass filter 33 shall pass a range of frequencies carrying color information to provide the desired form of output, it being understood of course that with the filter frequency characteristic described only the upper side band of the color information will be accepted.

This color information upon passing through the band pass filter 33 to the variable gain amplifier 35 is subject to control as to gain by the voltage developed in the discriminator 41 according to the procedure already explained. The variable gain amplifier 35 is intended to compensate for the effects of charge migration in the tube included in the camera 21 and to provide the effect of resaturation for lossess in amplitude of the 4 megacycle color repetition frequency and so operate that the discriminator output for conditions where there are two predominating colors functions in such a way that the amplifier gain increases and is greater than it would be for conditions where illumination was predominately a single primary or component color only. Consequently, the output signal from the variable gain amplifier 35 supplied as an input signal to the adder 29 will consist of color information compensating for the detrimental effects of charge migration within the camera tube. This input, however, includes only color information. For the development of complete color signals to be made available at the output, other signal information which is in the form of the camera output signal derived by way of the conductor 27 is added. The same conductor 27 carries information as to detail which is used to provide the mixed highs when available at the output of the band pass filter 31.

With signals available to indicate all of the red, green and blue component colors at the terminals 59, 61 and 63 respectively, and signals reaching the image detail which are identified as the mixed highs available at the terminal 67, it is apparent that there is available, as in the companion application Serial No. 259,193, above named, a signal source from which any desired type of selection may be brought about. Accordingly, the apparatus herein discussed becomes one of an especially flexible nature which adapts itself readily to various types of television operations, illustrative of which are the so-called type of system proposed by RCA during the course of the television hearings and the proposals which have been made by the industry group which are known as those of the NTSC (National Television System Committee). It is, of course, apparent that still other uses may be made of the signals available.

Having now described the invention, what is claimed is:

1. In color television apparatus for developing signals representative of an image in a plurality of component colors and wherein there is included a camera tube adapted to develop signal energy output indicative of the viewed image analyzed in its component colors, compensating circuitry for reducing the effect of charge migration due to differences in camera tube illumination in adjacent areas by light of less intensity in one component color than in the other component colors to be analyzed and subject to shift from one predominating color to another and to a mixture of predominating colors comprising means to derive from the developed signals a substantially sine wave of a frequency coinciding with the instantaneous color cycle repetition rate and of shifting phase depending on the instantaneously predominating color, means for multiplying the developed frequency by a factor corresponding to the selected number of primary colors, means for developing a signal voltage of stabilized phase and controlled frequency corresponding to the optimum color cycle repetition frequency and reference color phase and multiplied by the same factor, means to compare the phase of each of the multiplied frequencies to develop an output voltage indicative of phase difference, a variable gain amplifier for the developed signals, and means to control the amplifier gain by the phase difference signals developed by comparison.

2. Tricolor television apparatus for developing signals representative of an image in three component colors as a result of an image being projected on a camera tube adapted to develop signal energy output indicative of the viewed image analyzed in its chosen component colors, compensating circuitry for reducing the effects of charge migration due to differences in camera tube illumination in adjacent areas by light of less intensity in one component color than in the other two component colors to be analyzed and subject to shift from one predominating color to another and to a mixture of predominating colors comprising means to derive from the developed signals a color information signal wave of substantially sine wave character at a frequency coinciding with the instantaneous tricolor cycle repetition frequency and of phase shifting from instant to instant with changes in the predominating color of light, means for generating the third harmonic of the derived color signal wave, means for developing a signal voltage of stabilized phase and controlled frequency corresponding to the optimum tricolor cycle repetition frequency and reference color phase, means to derive the third harmonic of the stabilized and controlled frequency, means to compare the phase of each of the harmonic waves to develop an output voltage indicative of the phase difference between them, a variable gain amplifier for the developed color information signals, and means to control the amplifier gain by the phase difference signals developed by comparison.

3. In color television apparatus wherein there is included a camera tube adapted to develop signal energy output indicative of the viewed image analyzed in its component colors, so that the signals developed by scanning are representative of an image in a plurality of component colors, compensating circuitry for reducing the effects of charge migration due to differences in camera tube illumination in adjacent areas by light of less intensity in one component color than in the other component colors to be analyzed, which illuminating light is subject to shift from one predominating color to another and to a mixture of predominating colors comprising means to derive from the developed signals a wave of a frequency coinciding with the instantaneous color cycle repetition rate and of a phase depending on the instantaneously predominating color of the illuminating light, means for multiplying the developed frequency by a factor corresponding to the selected number of primary colors, means for developing a signal voltage of stabilized phase and controlled frequency corresponding to the optimum color cycle repetition frequency and reference color phase, means for multiplying the stabilized signal by the same factor, means to compare the phase of each of the waves at the multiplied frequency to develop an output voltage indicative of phase difference, a variable gain amplified for amplifying the color information portion of the developed signals, and means to control the amplifier gain by the phase difference signals developed by comparison.

4. In tricolor television apparatus wherein signals representative of an image in a plurality of component colors cyclically repeating at a frequency N are developed at a controlled tracking frequency of 3N/2 from a storage-type camera tube adapted to develop signal energy output indicative of a viewed image so analyzed, compensating circuitry for reducing the effects of charge migration within the camera tube due to differences in illumination in adjacent areas by light of less intensity in one component color than in the other component colors to be analyzed, and wherein the illuminating light is subject to shift from one predominating color to another, and to another and to a mixture of predominating colors comprising means to remove from the developed signals information relative to the tracking rate and detail in the image and to retain that portion of the information included in the developed signal which is indicative of color and wherein the said color information is constituted by sideband frequencies extending on at least one side of a carrier frequency N which constitutes the color cycle repetition frequency, means to derive from the color information signals substantially sine wave voltages of a frequency coinciding with the instantaneous color cycle repetition frequency and of a phase shifting in accordance with the instantaneously predominating color, means for obtaining a signal voltage of stabilized control frequency and phase corresponding to the optimum color cycle repetition frequency and a stabilized reference color phase, means for multiplying each of the last two signals by a factor corresponding to the selected number of component colors of the color cycle, means to compare the phase of each of the multiplied frequencies to develop an output voltage indicative of the phase difference between the signals, a variable gain amplifier for amplifying the signals containing color information and means to control the amplifier gain by the developed phase comparison output voltage to provide a color output signal of controlled magnitude.

5. Tricolor television apparatus wherein video signal information representative of an image in three cyclically repeating component colors recur at a frequency N and wherein the recurrence is at a tracking frequency of 3N/2 from a storage-type camera tube adapted to develop signal energy output indicative of a viewed image so analyzed, compensating circuitry for reducing the effects of charge migration within the camera tube due to differences in illumination in adjacent areas by light of less intensity in one component color than in the other component colors to be analyzed and wherein illuminating light is subject to shift from one predominating color to another and to a mixture of dominating colors comprising means to remove from the developed signals information relative to the tracking rate and detail in the image and to retain information indicative only of color included in the developed signal, and wherein the color information is constituted by sideband frequencies extending on at least one side of the color frequency N as a carrier and which information is in a frequency range normally not transmitted as video carrier modulation signals, means to derive from the color information signals substantially sine wave voltages repeating at a frequency coinciding with the instantaneous color cycle repetition frequency and of a phase relationship subject to shift in accordance with the instantaneously predominating component color, means for obtaining a signal voltage of stabilized control frequency and phase corresponding to the optimum color cycle repetition frequency and a stabilized reference color phase, means for deriving the third harmonic each of the last two signals, means to compare the phase of each harmonic frequency to develop an output voltage indicative in magnitude of the phase difference between the signals, a variable gain amplifier for amplifying only the signals containing color information, and means to control the amplifier gain in proportion to the magnitude of the developed phase comparison output voltage to provide an output color signal of magnitude controlled by the color content of the illuminating light.

6. The apparatus claimed in claim 5 comprising, in addition, means to derive from the video signal information a second train of signals providing information as to each of color and detail with the tracking information removed, and means to combine said last named signals additively with the gain controlled color signals to develop an output from which signals representative of each component color may be individually derived.

No references cited.